(12) United States Patent  (10) Patent No.: US 8,768,137 B2
Barrett et al.  (45) Date of Patent: Jul. 1, 2014

(54) PROGRAM SEGMENTS DISPLAY BAR

(75) Inventors: Peter T. Barrett, San Francisco, CA (US); Ronald A. Morris, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1295 days.

(21) Appl. No.: 11/956,353

(22) Filed: Dec. 14, 2007

(65) Prior Publication Data

US 2009/0154898 A1 Jun. 18, 2009

(51) Int. Cl.
*H04N 5/765* (2006.01)

(52) U.S. Cl.
USPC .......................................................... 386/124

(58) Field of Classification Search
USPC .......................................................... 386/124
See application file for complete search history.

(56) References Cited

U.S. PATENT DOCUMENTS

| | | | |
|---|---|---|---|
| 5,805,733 A | 9/1998 | Wang et al. | |
| 6,574,416 B1 | 6/2003 | Posa et al. | |
| 6,772,147 B2 | 8/2004 | Wang | |
| 6,882,793 B1 | 4/2005 | Fu et al. | |
| 6,909,837 B1 | 6/2005 | Unger | |
| 7,151,852 B2 | 12/2006 | Gong et al. | |
| 7,386,218 B2 * | 6/2008 | Temple et al. | 386/241 |
| 8,112,711 B2 * | 2/2012 | Ackley | 715/716 |
| 2003/0184598 A1 * | 10/2003 | Graham | 345/838 |
| 2003/0202110 A1 * | 10/2003 | Owens et al. | 348/222.1 |
| 2003/0229894 A1 * | 12/2003 | Okada et al. | 725/41 |
| 2005/0091597 A1 * | 4/2005 | Ackley | 715/716 |
| 2006/0056800 A1 | 3/2006 | Shimagami et al. | |
| 2006/0209368 A1 | 9/2006 | Suzuki et al. | |
| 2006/0265657 A1 | 11/2006 | Gilley | |
| 2007/0022183 A1 | 1/2007 | Klemets | |
| 2007/0047917 A1 | 3/2007 | Sasaki et al. | |
| 2007/0110399 A1 | 5/2007 | Roh | |
| 2007/0157228 A1 | 7/2007 | Bayer et al. | |
| 2007/0206923 A1 | 9/2007 | Murakoshi et al. | |

FOREIGN PATENT DOCUMENTS

| | | |
|---|---|---|
| CN | 1755823 | 4/2006 |
| CN | 1968416 | 5/2007 |
| EP | 1612657 | 1/2006 |

(Continued)

OTHER PUBLICATIONS

Drucker, Steven et al. SmartSkip: Consumer Level Browsing and Skipping of Digital Video Content. 2002. pp. 219-226. (included in applicant's IDS/prior art).*

(Continued)

*Primary Examiner* — Jason Gee
(74) *Attorney, Agent, or Firm* — Micah Goldsmith; Glen Johnson; Micky Minhas

(57) ABSTRACT

A program segments display bar is described. In embodiment(s), a program segments display bar has still images that can include scene images and advertisement images. The scene images can each correspond to a different segment of television media content, such as a movie or television program, and are displayed in the program segments display bar to indicate a sequence of the television media content. The advertisement images can each correspond to a different advertisement and can be displayed in the program segments display bar to indicate where the different advertisements are included with the television media content. The program segments display bar can also include a focus that can be positioned proximate a still image to indicate that the still image is selectable.

20 Claims, 6 Drawing Sheets

(56) References Cited

FOREIGN PATENT DOCUMENTS

| JP | 2005033308 | 2/2005 |
|----|------------|--------|
| JP | 2006339693 | 12/2006 |
| JP | 2007089012 | 4/2007 |
| JP | 2007134010 | 5/2007 |
| KR | 20060056028 | 5/2006 |

OTHER PUBLICATIONS

European Search Report, Mailed Date: Nov. 19, 2010, Application No. EP/08860880, Filed Date: Nov. 17, 2010, pp. 8.

Drucker, et al., "Smartskip: Consumer Level Browsing and Skipping of Digital Video Content", Proceedings of the SIGCHI conference on Human factors in computing systems: Changing our world, changing ourselves, vol. 04, Apr. 20-25, 2002, pp. 219-226.

PCT Search Report and Written Opinion, Application No. PCT/US2008/083708, (May 26, 2009), 12 pages.

Foreign Office Action, Chinese Application No. 200880121333.2, (Jun. 24, 2011).

Wang, et al., "Automatic story segmentation of news video based on audio-visual features and text information", Proceedings of the second International conference on Machine Learning and Cybernetics, Xi'An, vol. 5, 2003. IEEE, pp. 3008-3011.

Huang, et al., "A musical-driven video summarization system using content-aware mechanisms", vol. 3, 2005, IEEE, pp. 2711-2714.

Foreign Office Action, Chinese Application No. 200880121333.2, (May 30, 2012), 9 pages.

Foreign Office Action, Japanese Application No. 2010-538026, (Dec. 17, 2012), 5 pages.

Foreign Office Action, Chinese Application No. 200880121333.2, (Jan. 14, 2013), 8 pages.

Foreign Office Action, Japanese Application No. 2010-538026, Oct. 22, 2013, 4 Pages.

* cited by examiner

PROGRAM SEGMENTS DISPLAY BAR

BACKGROUND

The advent of on-demand programming, such as recorded or cached on-demand and broadcast media content, provides a viewer with the option to navigate a recorded or on-demand program with media content navigation commands commonly referred to as "trick modes". These media content navigation commands are typically initiated with a remote control device and include commands such as play, fast-forward, rewind, pause, and other navigation commands that were derived from tape transport mechanisms.

The fast-forward function, for example, provides a time-savings for a viewer when used to shorten the viewing time for a recorded program. However, the fast-forward function does not provide a convenient technique to locate segments or scenes of a recorded program that may be of interest to a viewer. Typically, video that is being displayed in a fast-forward mode must be observed by the viewer to input another remote control input, such as a play or pause command, at precisely the right time to keep from overrunning a particular scene and missing part of the recorded or on-demand program.

SUMMARY

This summary is provided to introduce simplified concepts of a program segments display bar. The simplified concepts are further described below in the Detailed Description. This summary is not intended to identify essential features of the claimed subject matter, nor is it intended for use in determining the scope of the claimed subject matter.

In embodiment(s), a program segments display bar has still images that can include scene images and advertisement images. The scene images can each correspond to a different segment of television media content, such as a movie or television program, and are displayed in the program segments display bar to indicate a sequence of the television media content. The advertisement images can each correspond to a different advertisement and can be displayed in the program segments display bar to indicate where the different advertisements are included with the television media content. The program segments display bar can also include a focus that can be positioned proximate a still image to indicate that the still image is selectable.

In other embodiment(s) of a program segments display bar, a viewer selection of a scene image can be received from the program segments display bar, such as when a viewer initiates a selection input to a television client device via a remote control device. The television client device can then shift to a beginning of the segment of the television media content that corresponds to the selected scene image, and render the television media content for display from the beginning of the segment of the television media content.

In other embodiment(s) of a program segments display bar, a focus implemented as any type of an indicator (e.g., a highlight, a pointer, an emphasis, etc.) can be positioned proximate an advertisement image in the program segments display bar, such as when a viewer initiates a navigation selection input to a television client device via a remote control device. The position of the focus proximate the advertisement image can be recognized, and the advertisement that corresponds to the advertisement image can be rendered for display. Alternatively, a viewer selection of an advertisement image from the program segments display bar can be received, the advertisement that corresponds to the advertisement image can be obtained, and the advertisement can then be rendered for display.

BRIEF DESCRIPTION OF THE DRAWINGS

Embodiments of a program segments display bar are described with reference to the following drawings. The same numbers are used throughout the drawings to reference like features and components.

DETAILED DESCRIPTION

Embodiments of a program segments display bar provide an interface by which a viewer can search for and select segments of television media content, such as a movie, an advertisement, or a television program. For example, a viewer can pause a television program which initiates a display of a program segments display bar that includes scene images of the television program and/or advertisement images. The scene images each correspond to a different segment of the television media content, where a segment may be any duration of seconds, minutes, etc. of the media content. The advertisement images each correspond to a different advertisement included within the television media content.

The viewer can navigate the program segments display bar to select a particular scene image that corresponds to a segment of the television media content that may be of interest to the viewer. A selection of the scene image then initiates rendering the media content for viewing from the beginning of the segment that corresponds to the selected scene image. In addition, the viewer can navigate the display bar to select a particular advertisement image that corresponds to an advertisement which may be of interest to the viewer. A selection of the advertisement image then initiates rendering the corresponding advertisement for viewing.

While features and concepts of the described systems and methods for a program segments display bar can be implemented in any number of different environments, systems, and/or various configurations, embodiments of a program segments display bar are described in the context of the following example systems and environments.

Figure 1:
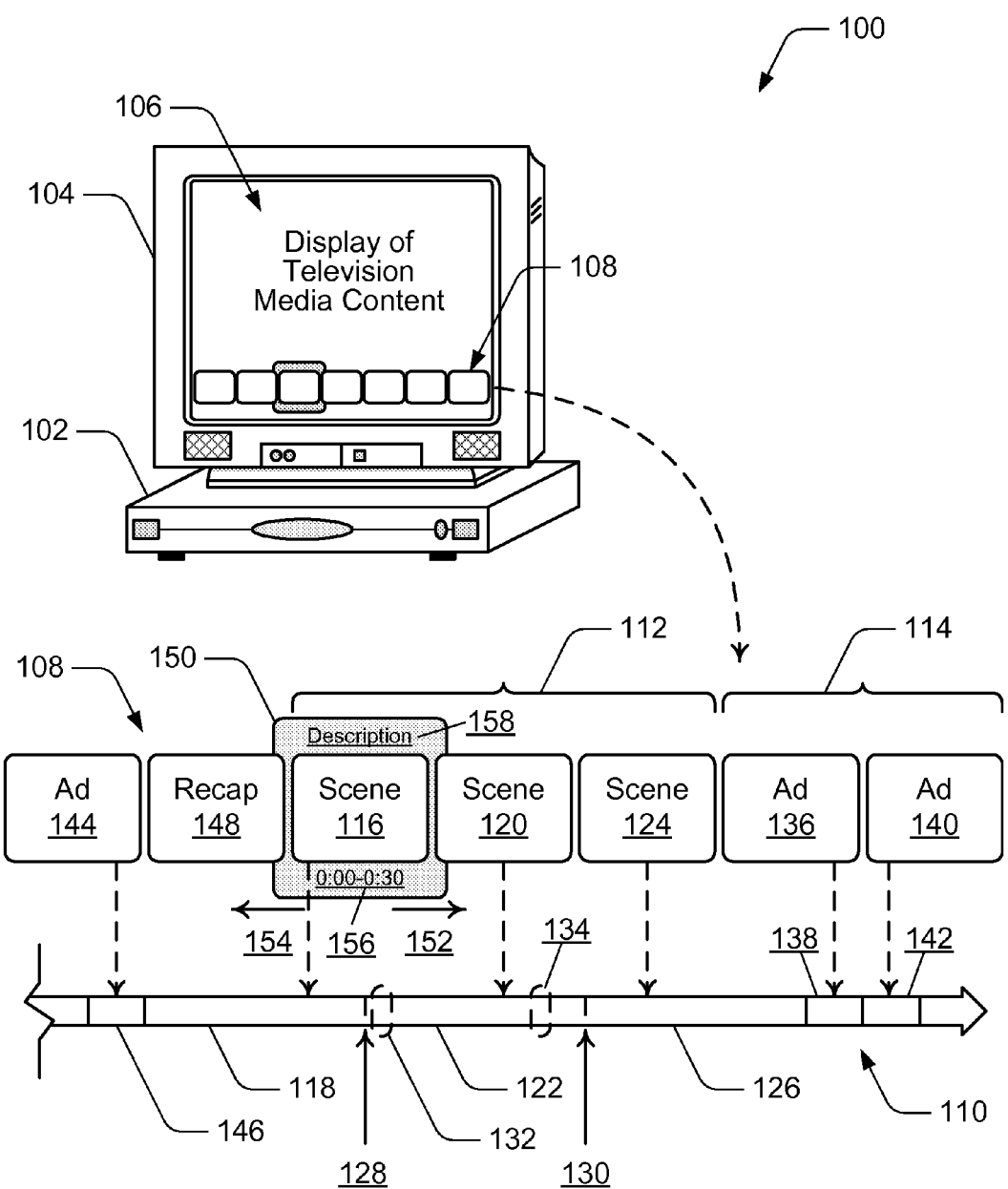
FIG. 1 illustrates an example system in which embodiments of a program segments display bar can be implemented.

FIG. 1 illustrates an example system 100 in which various embodiments of a program segments display bar can be implemented. In this example, system 100 includes a client device 102 and a display device 104. The client device 102 and display device 104 together are an example of a television client system that renders audio, video, and/or image data. The display device 104 can be implemented as any type of television, LCD, or similar display system to display television media content 106 and a program segments display bar 108. In this example, the television media content 106 is shown as a full-screen display and the program segments display bar 108 is displayed over the full-screen display of the television media content.

The program segments display bar 108 can be implemented to provide an interface by which a viewer can search for and select segments of television media content, such as a movie, an advertisement, or a television program. As described throughout, "media content" and "television media content" can include television programs (or programming) which may be any form of programs, commercials, advertisements, music, movies, and video-on-demand media content. Other media content can include interactive games, network-based applications, and any other audio, video, and/or image content (e.g., to include program guide application data, user interface data, search results and/or recommendations, and the like).

In the example system 100, the television media content 106 represents a television program that is rendered for display by client device 102 when received as a video stream 110 of the television media content. The program segments display bar 108 can be generated for display on the display device 104, such as when a viewer watching the television media content 106 initiates a "pause" command via a remote control device to pause the display of the television media content. The program segments display bar 108 can be displayed to include various still images, such as scene images 112 and/or advertisement images 114. In this example, the program segments display bar 108 is shown as a horizontal display bar positioned near the bottom of the display screen on display device 104. The position and orientation of the program segments display bar 108 is merely exemplary, and for example, may be implemented as a vertical display bar on the display.

The scene images 112 each correspond to a different segment of the television media content where a segment can be any duration (e.g., seconds, minutes, etc.) of the television media content. For example, scene image 116 corresponds to video segment 118 in the video stream 110 of the television media content. Similarly, scene image 120 corresponds to video segment 122, and scene image 124 corresponds to video segment 126 in the video stream 110 of the television media content. In an implementation, the duration of the segments of the television media content can be viewer configurable. The various scene images 112 are also displayed in the program segments display bar 108 to indicate a sequence of the television media content. For example, scene image 116 represents the video segment 118 of the television media content before the video segment 122 that is represented by scene image 120.

A video segment 122 of video stream 110 has a segment beginning 128 (e.g., a beginning of the segment) and a segment end 130 (e.g., an end of the segment). A scene image in the program segments display bar 108, such as scene image 120, can be generated from a video frame 132 (e.g., an MPEG frame in one example) at the segment beginning 128, or can be generated from a video frame 134 from any other position within the video segment, such as a video frame that best represents the segment of the television media content to a viewer. Alternatively, a scene image can be generated from a compilation of images compiled from the segment of the television media content.

In an embodiment, the program segments display bar 108 includes the advertisement images 114 that each correspond to a different advertisement included with the television media content. Further, the advertisement images 114 can indicate where the different advertisements are included within the video stream 110 of the television media content. For example, advertisement image 136 corresponds to an advertisement 138 in the video stream 110 of the television media content. Similarly, advertisement image 140 corresponds to an advertisement 142, and advertisement image 144 corresponds to an advertisement 146 in the video stream 110 of the television media content.

An advertisement image in the program segments display bar 108, such as advertisement image 136, can be generated from a video frame at the beginning of the advertisement, generated from a video frame that best represents the advertisement, or generated from a compilation of images compiled from the advertisement. An advertisement image in the program segments display bar can also be implemented as an image that is representative of the advertisement, as a graphic representation of the advertisement, and/or as any segmented graphic of the corresponding advertisement.

In an embodiment, the program segments display bar 108 can also include other still images that correspond to the displayed television media content 106, such as a television program. For example, the program segments display bar 108 can include a "Recap" image 148 that identifies the television media content by title, logo, image, or any other indication. The recap image 148 can be generated from a video frame (e.g., an MPEG frame in one example) selected from a beginning of the video stream 110 of the television media content, or generated from a video frame from any other position within the video stream 110, such as from a video frame that best represents the television program to a viewer. Alternatively, the recap image 148 can be generated from a compilation of images compiled from the video stream 110 of the television media content.

In an embodiment, the program segments display bar 108 can also include a focus 150 that can be positioned near, on, over, around, or otherwise proximate a scene image or an advertisement image in the program segments display bar 108 to indicate that the scene image or advertisement image is selectable. For example, a viewer can enter a navigation input, such as via a remote control device, to move the focus 150 in a first direction 152 and/or in a second direction 154 to position the focus 150 near any one of the still images in the program segments display bar 108. A navigation input or selection can be initiated to move the focus to the right (i.e., the first direction 152 to advance or skip ahead in the television media content), and/or a navigation input or selection can be initiated to move the focus to the left (i.e., the second direction 154 to move or skip back in the television media content).

In this example system 100, the program segments display bar 108 is only shown to have the one recap image 148, the advertisement images 114 and 144, and just the three scene images 112. In an embodiment, however, the program segments display bar 108 scrolls across the display screen of display device 104 as navigation inputs are received to move the focus 150 in either the first direction 152 and/or the second direction 154. For example, additional scene images for a television program will continue to be displayed in sequence after advertisement image 140 in an event that the focus 150 is moved in the first direction 152 past the advertisement image 140.

The focus 150 can be implemented as any type of an indicator (e.g., a highlight, a pointer, an emphasis, etc.) and positioned such that a particular image is selectable from the program segments display bar 108. In another embodiment, the focus 150 can be implemented to include a time or other duration indication 156 of the corresponding segment of the television media content. For example, scene image 116 may correspond to the first segment of the television media content and represent the first thirty seconds of the television program. In another embodiment, the focus 150 can be implemented to include a description 158 of the segment of the television media content.

A viewer can position the focus 150 and initiate a selection of a scene image or an advertisement image. For example, a viewer can enter a selection input via a remote control device to select scene image 116 that is indicated as being selectable by the focus 150. Client device 102 can then initiate a shift to the beginning of the video segment 118 in the video stream 110 that corresponds to the selected scene image and begin rendering the television media content 106 for display from the beginning of the segment. In another example, a viewer can position the focus 150 and enter a selection input via a remote control device to select advertisement image 136. Client device 102 can then obtain and render the advertisement 138 that corresponds to the select advertisement image 136.

In an embodiment, client device 102 can recognize that the focus 150 is positioned proximate an advertisement image on the program segments display bar, and initiate that the advertisement image and/or the corresponding advertisement be rendered for full-screen display. In an implementation, the focus 150 (or other such indicator) can be recognized when it simply passes over, or rolls over, the advertisement image which then initiates the full-screen display of the advertisement image or the corresponding advertisement itself. In another implementation, the focus 150 (or other such indicator) can be recognized after a duration of time in a pause or "hover state" when proximate an advertisement image which then initiates the full-screen display of the advertisement image or the corresponding advertisement itself.

Figure 2:
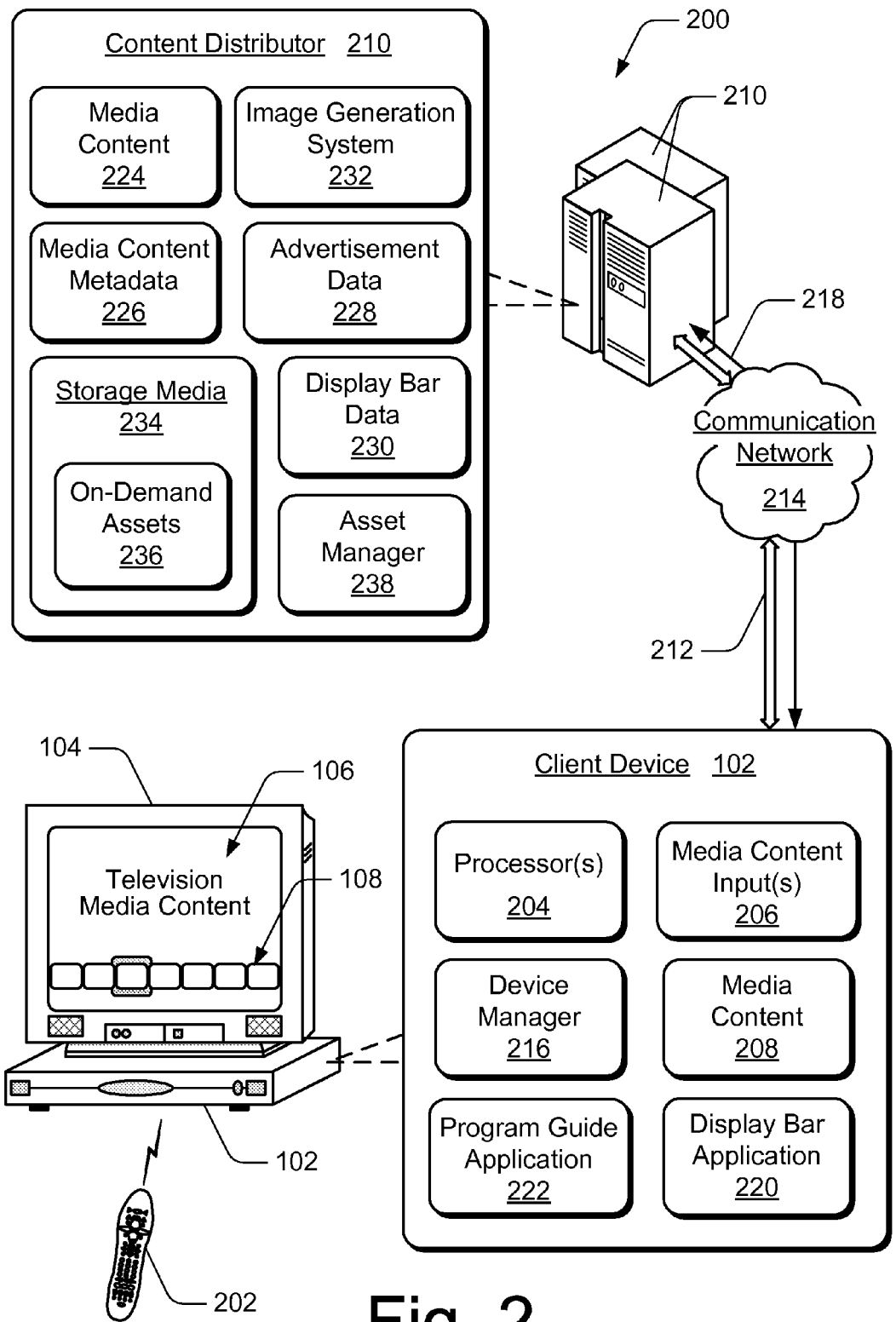
FIG. 2 illustrates another example system in which embodiments of a program segments display bar can be implemented.

FIG. 2 illustrates an example system 200 in which various embodiments of a program segments display bar can be implemented. In this example, system 200 includes the client device 102 and the display device 104 that can display television media content 106 and/or the program segments display bar 108. A viewer can interact with client device 102 and initiate viewer navigations inputs and image selections from the program segments display bar 108 with user inputs on an input device 202, such as a television remote control.

The example client device 102 can be implemented as any one or combination of a television set-top box, a digital video recorder (DVR) and playback system, an appliance device, a gaming console, a portable communication device, a portable computing device, and/or as any other type of television client device or computing-based device that may be implemented in a television entertainment and information system. Additionally, client device 102 can be implemented with any number and combination of differing components as further described with reference to the example device shown in FIG. 5. Client device 102 may also be associated with a user or viewer (i.e., a person) and/or an entity that operates the device such that a client device describes logical clients that include users, software, and/or devices.

In the example system 200, client device 102 includes one or more processors 204 (e.g., any of microprocessors, controllers, and the like), media content inputs 206, and media content 208 (e.g., received media content, media content that is being received, display bar data, etc.). Client device 102 can be configured for communication with various content distributor(s) 210 via an IP-based network 212 and/or communication network 214. The media content inputs 206 can include any type of communication interfaces and/or data inputs, such as Internet Protocol (IP) inputs over which streams of television media content (e.g., IPTV media content) are received via the IP-based network 212 and/or communication network 214. The media content inputs 206 can include any type of wireless, broadcast, and/or over-the-air inputs via which media content is received. In addition, client device 102 can receive scene images, advertisement images, advertisement data, and/or display bar data from any one or more of the content distributors 210 via the media content inputs 206.

The IP-based network 212 can be implemented as part of the communication network 214 that facilitates media content distribution and data communication between the content distributor(s) 210 and any number of client devices, such as client device 102. The communication network 214 can be implemented as part of a media content distribution system using any type of network topology and/or communication protocol, and can be represented or otherwise implemented as a combination of two or more networks.

Client device 102 also includes a device manager 216 (e.g., a control application, software application, etc.) that can be implemented as computer-executable instructions and executed by the processor(s) 204 to implement various embodiments and/or features of a program segments display bar. The device manager 216 can be implemented to monitor and/or receive selectable inputs (e.g., viewer selections, navigation inputs, etc.) via the input device 202, and initiate communication of viewer selections back to a content distributor 210.

Client device 102 can communicate with any number of content distributors 210 via a two-way data communication link 218 of the communication network 214. It is contemplated that any one or more of the arrowed communication link 218 and network 212, along with communication network 214, facilitate two-way data communication, such as from client device 102 to a content distributor 210 and vice-versa.

Client device 102 can also include a display bar application 220 which can be implemented as computer-executable instructions and executed by the processor(s) 204 to implement various embodiments and/or features of a program segments display bar. In an embodiment, the display bar application 220 can be implemented to receive and process program segments display bar data, and generate the program segments display bar 108 for display on display device 104. Client device 102 can also include a program guide application 222 that can be implemented to process program guide data from which a program guide can be rendered and/or displayed for viewing on display device 104. A program guide may also be commonly referred to as an electronic program guide or an "EPG". In an embodiment, the display bar application 220 can be implemented as a module of the program guide application 222.

Although the display bar application 220 and the program guide application 222 are each illustrated and described as single applications (e.g., independent components of client device 102), each can be implemented as several component applications or modules distributed to implement various embodiments of a program segments display bar. Alternatively, the display bar application 220 and the program guide application 222 can be implemented together as a multifunctional component of client device 102 to implement embodiments of a program segments display bar.

A content distributor 210 can distribute media content 224, media content metadata 226, advertisement data 228, and/or display bar data 230 to any number of television client devices as an IPTV multicast via the IP-based network 212 and/or the communication network 214. The content distributor 210 can also include various components to implement embodiments of a program segments display bar, such as an image generation system 232 which can be implemented to generate scene images and/or advertisement images for display in a program segments display bar.

In an embodiment, the image generation system 232 can be implemented to include video encoding techniques that provide for an analysis of closed caption data to determine where advertisements are as well as where individual scenes within television media content, such as a movie or television program, begin and end. Individual frames (e.g., still images, MPEG video frames, etc.) from the television media content can be determined with image recognition techniques and stored separately from the video as the media content metadata 226, the advertisement data 228, and/or the display bar data 230. The individual frames can then be displayed as the scene images and/or the advertisement images in the program segments display bar 108 which provides that a viewer can select to view or skip advertisements, and search for and select segments of the television media content by advancing forward or navigating backward in a television program to accurately locate a desired portion of the program.

In this example system 200, content distributor 210 also includes storage media 234 to store or maintain the media content 224, media content metadata 226, advertisement data 228, display bar data 230, and/or on-demand assets 236 that can be requested by various television client devices. The content distributor 210 can also include an asset manager 238 to manage the assets maintained by the content distributor, such as the media content 224 and the on-demand assets 236. In addition, a content distributor 210 can be implemented with any number and combination of differing components as further described with reference to the example device shown in FIG. 5 and/or the example content distributor shown in FIG. 6.

Generally, any of the functions, methods, procedures, and modules described herein can be implemented using hardware, software, firmware (e.g., fixed logic circuitry), manual processing, or any combination thereof. A software implementation of a function, method, procedure, or module represents program code that performs specified tasks when executed on a computing-based processor. Example methods 300 and 400 described with reference to respective FIGS. 3 and 4 may be described in the general context of computer-executable instructions. Generally, computer-executable instructions can include applications, routines, programs, objects, components, data structures, procedures, modules, functions, and the like that perform particular functions or implement abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
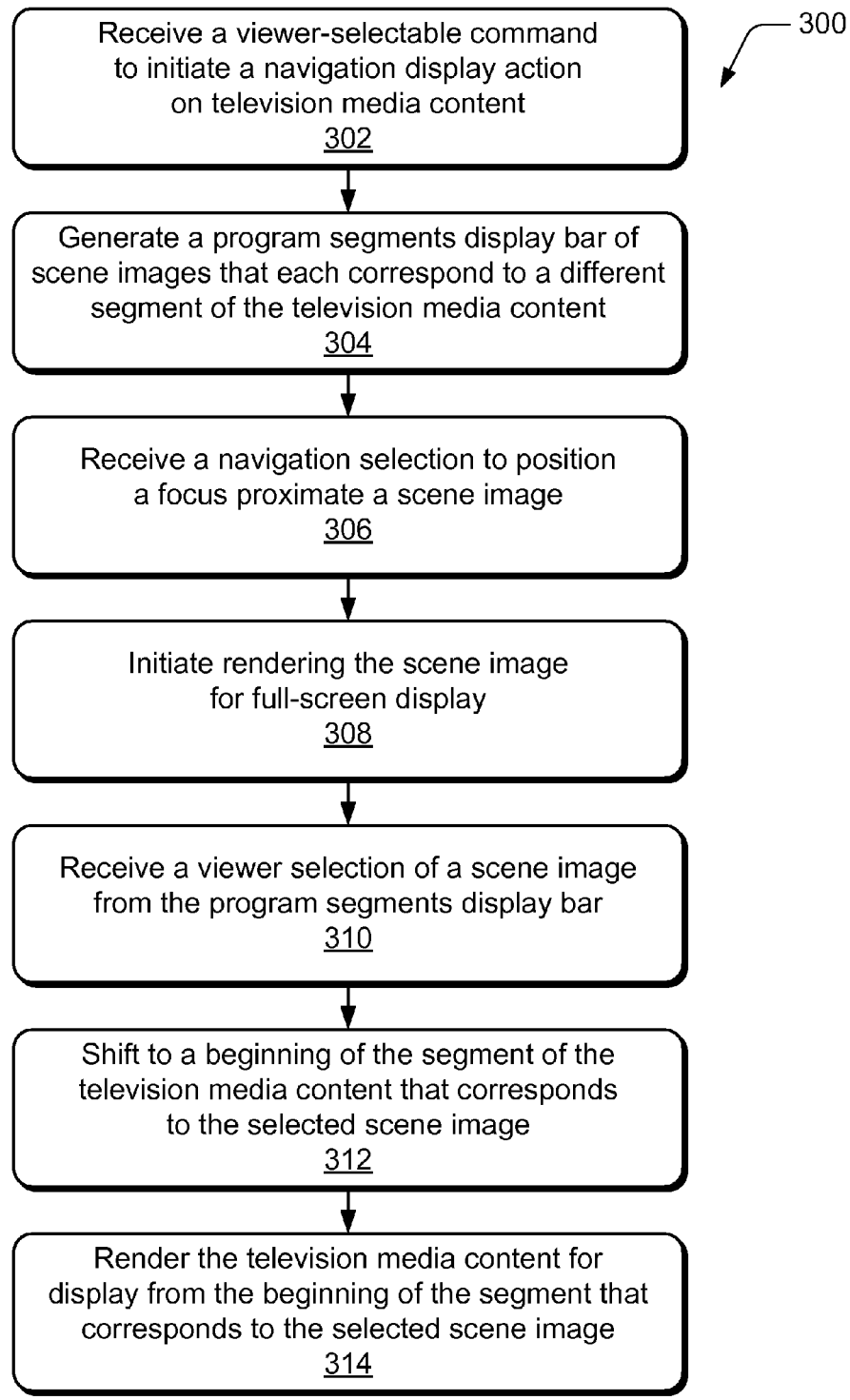
FIG. 3 illustrates example method(s) for various embodiments of a program segments display bar.

FIG. 3 illustrates example method(s) 300 for various embodiments of a program segments display bar. The order in which the method is described is not intended to be construed as a limitation, and any number of the described method blocks can be combined in any order to implement the method, or an alternate method.

At block 302, a viewer-selectable command is received to initiate a navigation display action on television media content. For example, a viewer watching television media content 106, such as a movie or a television program, may initiate a "pause" command with input device 202 to pause the display of the media content. The device manager 216 at client device 102 receives the pause command and pauses the display of the television media content 106.

At block 304, a program segments display bar of scene images that each correspond to a different segment of the television media content is generated for display. For example, the display bar application 220 generates the program segments display bar 108 which includes the scene images 112 that are displayed in the program segments display bar 108 to indicate a sequence of the television media content 106. A scene image 120 in the program segments display bar 108 can be generated from a video frame 132 at the beginning 128 of the video segment 122 in the video stream 110 of the television media content, or can be generated from a video frame 134 that best represents the video segment 122 of the television media content. In an implementation, the program segments display bar 108 is generated for display such that a current scene image which corresponds to the segment of the television media content that is paused is shown in the program segments display bar 108.

At block 306, a navigation selection is received to position a focus proximate a scene image. For example, a viewer may enter a navigation input via the input device 202 to position the focus 150 near, on, over, around, or otherwise proximate the scene image 116 in the program segments display bar 108 to indicate that the scene image 116 is selectable. The device manager 216 at client device 102 receives the navigation selection to position the focus 150 proximate the scene image 116.

At block 308, the scene image is rendered for full-screen display. For example, the display bar application 220 recognizes the position of the focus 150 proximate the scene image 116 and initiates a full-screen display of the scene image (e.g., as the television media content 106 shown on display device 104). The device manager 216 at client device 102 initiates rendering the scene image as the full-screen display.

At block 310, a viewer selection of a scene image from the program segments display bar is received. For example, a viewer may enter a selection input via the input device 202 to select the scene image 116 that is identified or otherwise indicated as being selectable by the focus 150. The device manager 216 at client device 102 receives the viewer selection of the scene image.

At block 312, a shift is made to a beginning of the segment of the television media content that corresponds to the selected scene image. For example, the display bar application 220 initiates a shift to the beginning of the segment in the video stream 110 that corresponds to the scene image 116 selected by a viewer. At block 314, the television media content is rendered for display from the beginning of the segment of the television media content that corresponds to the selected scene image. For example, the device manager 216 initiates rendering the television media content 106 from the beginning of the segment of the television media content that corresponds to the selected scene image.

Figure 4:
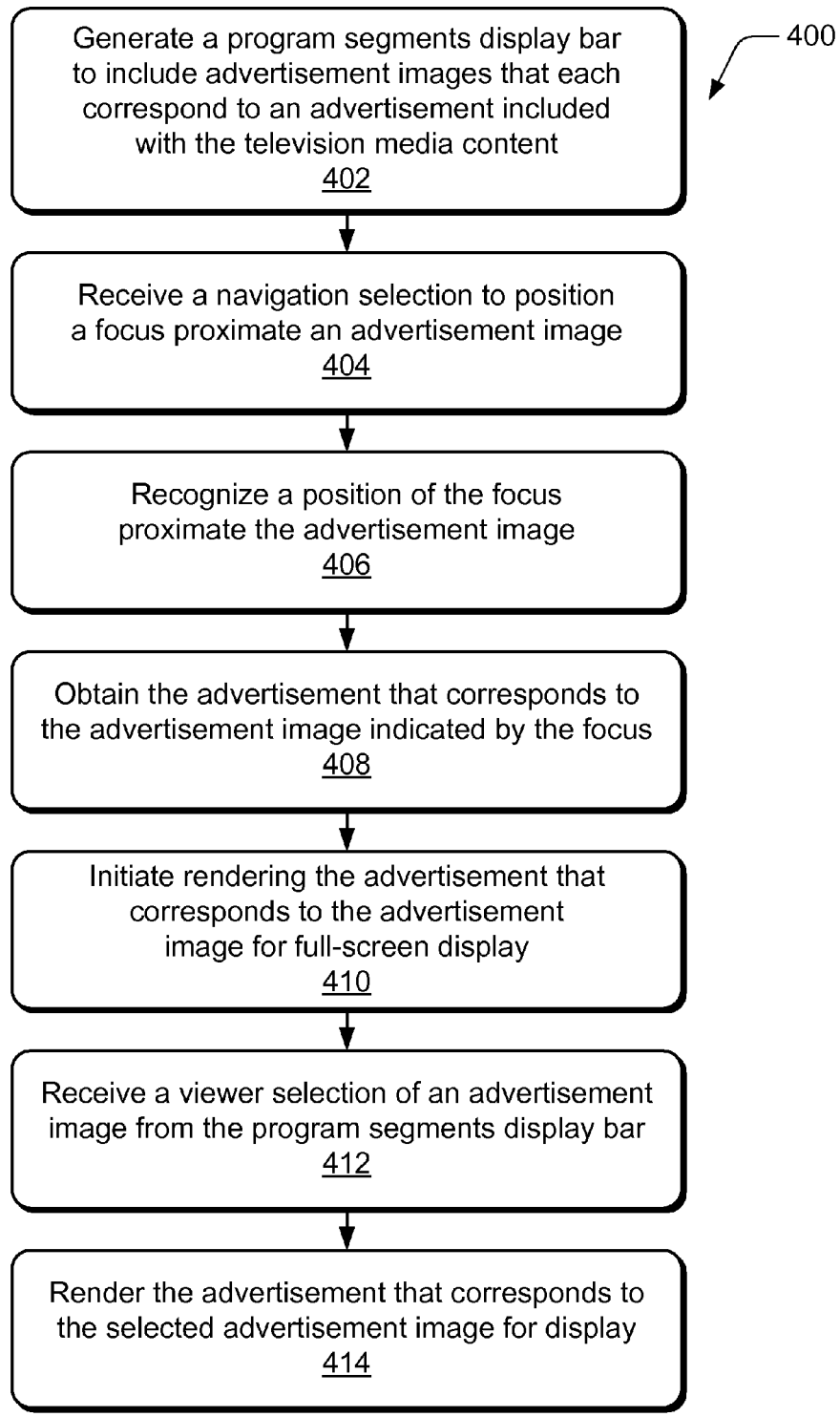
FIG. 4 illustrates example method(s) for various embodiments of a program segments display bar.

FIG. 4 illustrates example method(s) 400 for various embodiments of a program segments display bar. The order in which the method is described is not intended to be construed as a limitation, and any number of the described method blocks can be combined in any order to implement the method, or an alternate method.

At block 402, a program segments display bar is generated to include advertisement images that each correspond to an advertisement included with the television media content. For example, the display bar application 220 generates the program segments display bar 108 which includes the advertisement images 114. The advertisement images 114 can also be displayed in the program segments display bar 108 to indicate a sequence of the advertisements within the television media content. An advertisement image in the program segments display bar can be generated from a video frame at the beginning of an advertisement, generated from a video frame that best represents the advertisement, or generated from a compilation of images compiled from the advertisement.

At block 404, a navigation selection is received to position a focus proximate an advertisement image. For example, a viewer may enter a navigation input via the input device 202 to position the focus 150 near, on, over, around, or otherwise proximate an advertisement image 136 in the program segments display bar 108 to indicate that the advertisement image 136 is selectable. The device manager 216 at client device 102 receives the navigation selection to position the focus 150 proximate the advertisement image 136.

At block 406, the position of the focus proximate the advertisement image is recognized and, at block 408, the advertisement that corresponds to the advertisement image is obtained. For example, the display bar application 220 recognizes the position of the focus 150 proximate the advertisement image 136 and initiates the device manager 216 at client device 102 to obtain the advertisement 138 that corresponds to the advertisement image 136. In various implementations, client device 102 can obtain the advertisement 138 stored locally at the client device, or obtain the advertisement from a content distributor 210. At block 410, the advertisement that corresponds to the advertisement image is rendered for full-screen display. For example, the device manager 216 at client device 102 initiates rendering the advertisement that corresponds to the advertisement image as the full-screen display.

At block 412, a viewer selection of an advertisement image from the program segments display bar is received. For example, a viewer may enter a selection input via the input device 202 to select the advertisement image 136 that can be identified or otherwise indicated as selectable by the focus 150. The device manager 216 at client device 102 receives the viewer selection of the advertisement image. At block 414, the advertisement that corresponds to the selected advertisement image is rendered for display. For example, the device manager 216 at client device 102 initiates rendering the advertisement that corresponds to the selected advertisement image.

Figure 5:
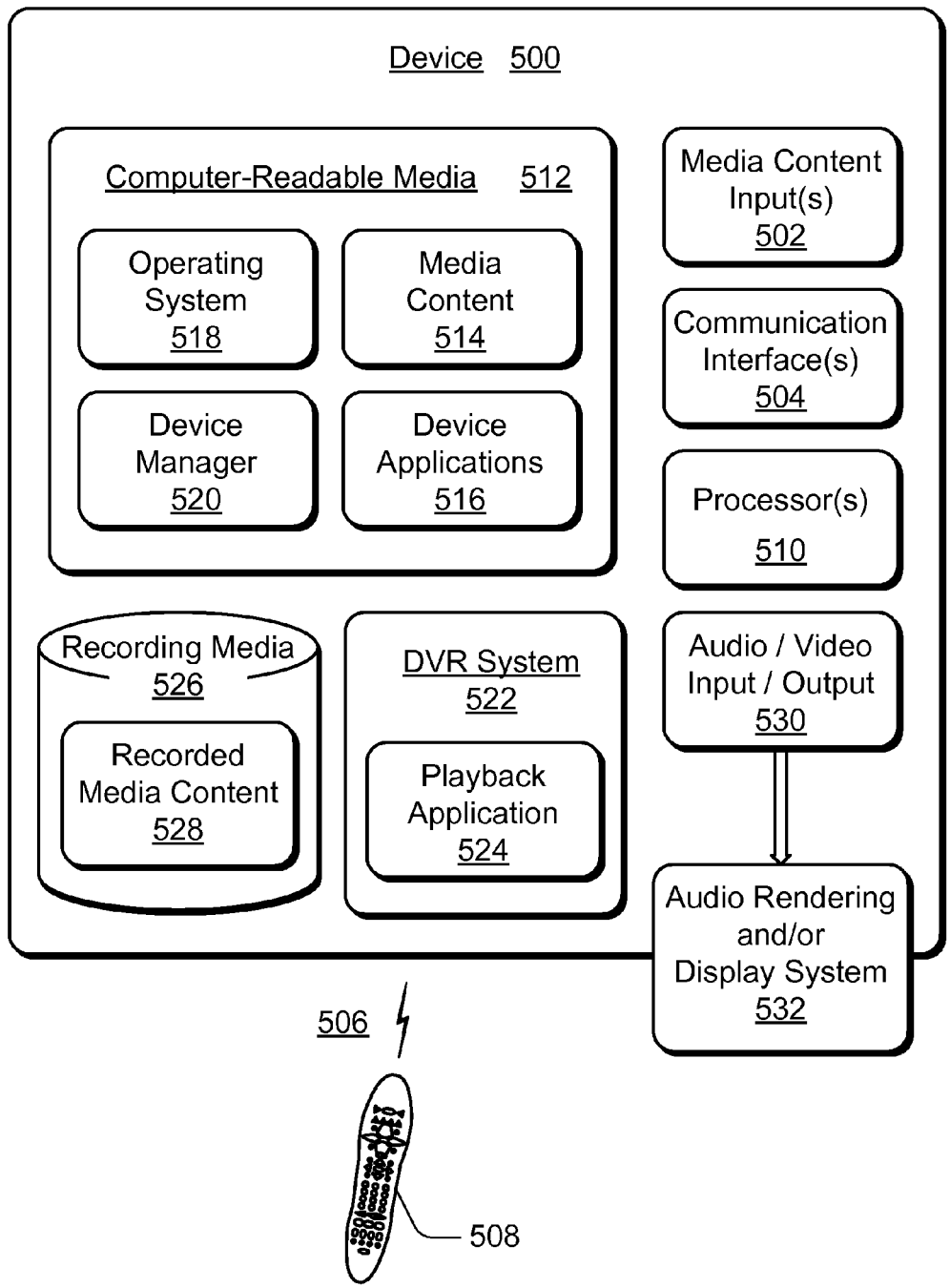
FIG. 5 illustrates various components of an example device which can implement embodiments of a program segments display bar.

FIG. 5 illustrates various components of an example device 500 that can be implemented as any form of a computing, electronic, and/or appliance device to implement various embodiments of a program segments display bar. For example, device 500 can be implemented as the television client device shown in FIGS. 1 and 2, and/or as a content distributor shown in FIG. 2. In various embodiments, device 500 can be implemented as any one or combination of a television client device, a digital video recorder (DVR), a gaming system or console, a computing-based device, and/or as any other type of similar device.

Device 500 includes one or more media content inputs 502 that may include Internet Protocol (IP) inputs over which streams of media content are received via an IP-based network. Device 500 further includes communication interface(s) 504 that can be implemented as any one or more of a serial and/or parallel interface, a wireless interface, any type of network interface, a modem, and as any other type of communication interface. A network interface provides a connection between device 500 and a communication network by which other electronic and computing devices can communicate data with device 500.

Similarly, a serial and/or parallel interface provides for data communication directly between device 500 and the other electronic or computing devices. A modem also facilitates communication with other electronic and computing devices via a conventional telephone line, a DSL connection, cable, and/or other type of connection. A wireless interface enables device 500 to receive control input commands 506 and other data from an input device, such as from remote control device 508, a portable computing-based device (such as a cellular phone), or from another infrared (IR), 802.11, Bluetooth, or similar RF input device.

Device 500 also includes one or more processors 510 (e.g., any of microprocessors, controllers, and the like) which process various computer-executable instructions to control the operation of device 500, to communicate with other electronic and computing devices, and to implement embodiments of a program segments display bar. Device 500 can be implemented with computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 512 provides data storage mechanisms to store media content 514, as well as device applications 516 and any other types of information and/or data related to operational aspects of device 500. For example, an operating system 518 can be maintained as a computer application with the computer-readable media 512 and executed on processor(s) 510. The device applications 516 can include a device manager 520 and/or a display bar when device 500 is implemented as a television client device. The device applications 516 and the device manager 520 are shown as software modules in this example to implement various embodiments of a program segments display bar. An example of the device manager 520 is described with reference to device manager 216, and the display bar application 220 is described with reference to client device 102 shown in FIG. 2.

When implemented as a television client device, the device 500 can also include a DVR system 522 with a playback application 524, and recording media 526 to maintain recorded media content 528 that device 500 receives and/or records. The recorded media content 528 can include the media content 514 that is received from a content distributor and recorded. For example, the media content 528 can be recorded when received as a viewer-scheduled recording, or when the recording media 526 is implemented as a pause buffer that records the media content 528 as it is being received and rendered for viewing.

Further, device 500 may access or receive additional recorded media content that is maintained with a remote data store (not shown). Device 500 may also receive media content from a video-on-demand server, or media content that is maintained at a broadcast center or content distributor that distributes the media content to subscriber sites and client devices. The playback application 524 can be implemented as a media control application to control the playback of media content 514, the recorded media content 528, and/or any other audio, video, and/or image media content which can be rendered and/or displayed for viewing.

Device 500 also includes an audio and/or video output 530 that provides audio and/or video data to an audio rendering and/or display system 532. The audio rendering and/or display system 532 can include any devices that process, display, and/or otherwise render audio, video, and image data. Video signals and audio signals can be communicated from device 500 to a display device via an RF (radio frequency) link, S-video link, composite video link, component video link, DVI (digital video interface), analog audio connection, or other similar communication link. Alternatively, the audio rendering and/or display system 532 can be implemented as integrated components of the example device 500.

Figure 6:
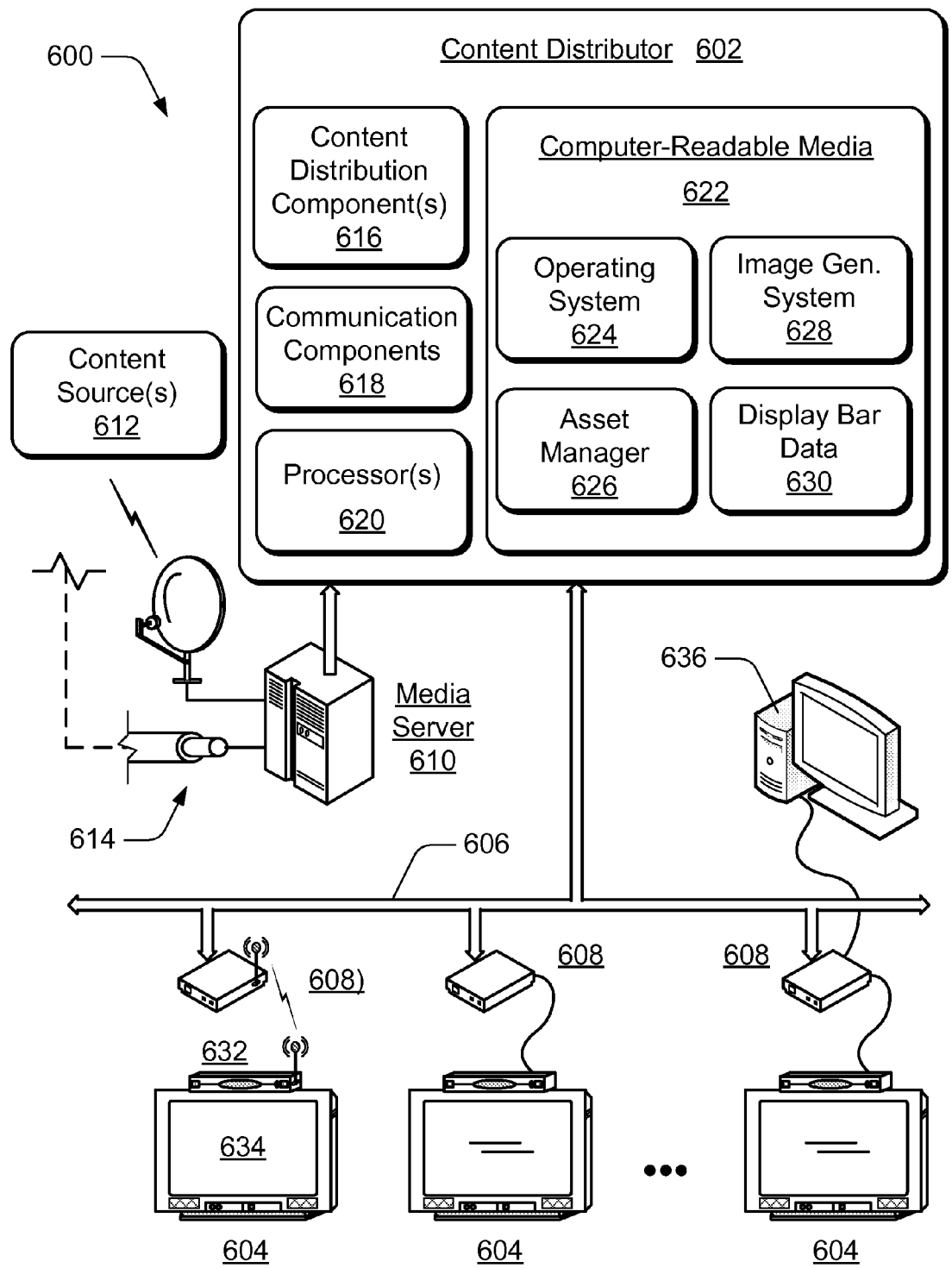
FIG. 6 illustrates various devices and components in an example entertainment and information system in which embodiments of a program segments display bar can be implemented.

FIG. 6 illustrates an example entertainment and information system 600 in which various embodiments of a program segments display bar can be implemented. System 600 facilitates the distribution of media content, program guide data, advertising content, and content metadata to multiple viewers and viewing systems. System 600 includes a content distributor 602 and any number of client systems 604 each configured for communication via a communication network 606. Each of the client systems 604 can receive data streams of media content, program content, program guide data, advertising content, closed captions data, content metadata, and the like from content server(s) of the content distributor 602 via the communication network 606.

The communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608, such as routers, gateways, and so on to facilitate communication between content distributor 602 and the client systems 604.

System 600 includes a media server 610 that receives content from various content sources 612, such as media content from a content provider, program guide data from a program guide source, and advertising content from an advertisement provider. In an embodiment, the media server 610 represents an acquisition server that receives audio and video content from a provider, an EPG server that receives the program guide data from a program guide source, and/or an advertising management server that receives the advertising content from an advertisement provider.

The content sources, such as the content provider, program guide source, and the advertisement provider control distribution of the media content, the program guide data, and the advertising content to the media server 610 and/or to other servers of system 600. The media content, program guide data, and advertising content can be distributed via various transmission media 614, such as satellite transmission, radio frequency transmission, cable transmission, and/or via any number of other wired or wireless transmission media. In this example, media server 610 is shown as an independent component of system 600 that communicates the program content, program guide data, and advertising content to content distributor 602. In an alternate implementation, media server 610 can be implemented as a component of content distributor 602.

Content distributor 602 is representative of a headend service in a content distribution system, for example, that provides the media content, program guide data, advertising content, and content metadata to multiple subscribers (e.g., the client systems 604). The content distributor 602 can be implemented as a satellite operator, a network television operator, a cable operator, and the like to control distribution of media content, program and advertising content, such as movies, television programs, commercials, music, and any other audio, video, and/or image content to the client systems 604.

Content distributor 602 includes various content distribution components 616 to facilitate media content processing and distribution, such as a subscriber manager, a device monitor, and one or more content servers. The subscriber manager manages subscriber data, and the device monitor monitors the client systems 604 (e.g., and the subscribers), and maintains monitored client state information.

Although the various managers, servers, and monitors of content distributor 602 (to include the media server 610 in one embodiment) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of a program segments display bar.

In this example, the content distributor 602 includes communication components 618 that can be implemented to facilitate media content distribution to the client systems 604 via the communication network 606. The content distributor 602 also includes one or more processors 620 (e.g., any of microprocessors, controllers, and the like) which process various computer-executable instructions to control the operation of content distributor 602. The content distributor 602 can be implemented with computer-readable media 622 which provides data storage to maintain software applications such as an operating system 624, an asset manager 626, and an image generation system 628. The computer-readable media 622 can also provide data storage to maintain display bar data 630 for a program segments display bar.

The client systems 604 can each be implemented to include a client device 632 and a display device 634 (e.g., a television, LCD, and the like). A client device 632 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, a client system 604 may implemented with a computing device 636 as well as a client device. Additionally, any of the client devices 632 of a client system 604 can implement features and embodiments of program segments display bar as described herein.

Although embodiments of a program segments display bar have been described in language specific to features and/or methods, it is to be understood that the subject of the appended claims is not necessarily limited to the specific features or methods described. Rather, the specific features and methods are disclosed as example implementations of a program segments display bar.

The invention claimed is:

1. A method, comprising:
receiving a viewer-selectable command to initiate a navigation display action on television media content;
generating a program segments display bar of scene images that each correspond to a different scene of the television media content, the scene images each comprising a still image that is a compilation of two or more images selected from positions within each of the different scenes, the scene images being displayed in the program segments display bar to indicate a sequence of the television media content;

receiving a viewer selection of a scene image from the program segments display bar to initiate rendering of the television media content that corresponds to the selected scene image for full-screen display, the scene image that is selected being surrounded by a focus positioned proximate the scene image according to a navigation selection, the navigation selection effective to initiate rendering of an advertisement for full-screen display when the navigation selection positions the focus proximate an advertisement image;

shifting to a beginning of the scene of the television media content that corresponds to the selected scene image; and rendering the television media content for full-screen display from the beginning of the scene of the television media content that corresponds to the selected scene image.

2. A method as recited in claim 1, further comprising receiving the navigation selection to position the focus proximate the scene image such that the focus indicates that the scene image is selectable.

3. A method as recited in claim 1, wherein the program segments display bar further includes the advertisement image that corresponds to the advertisement which is included with the television media content.

4. A method as recited in claim 3, further comprising:
receiving the navigation selection to position the focus proximate the advertisement image;
recognizing the position of the focus proximate the advertisement image;
obtaining the advertisement that corresponds to the selected advertisement image; and
rendering the advertisement that corresponds to the advertisement image for full-screen display based on the navigation selection regardless of whether a viewer selection of the advertisement image is received.

5. A method as recited in claim 3, further comprising recognizing a position of the focus proximate the advertisement image, and initiating that the advertisement image be rendered for full-screen display.

6. A method as recited in claim 1, further comprising recognizing a position of the focus proximate the scene image, and initiating that the scene image be rendered for full-screen display.

7. A method as recited in claim 1, wherein the scene image in the program segments display bar includes at least one image generated from a video frame at the beginning of the scene of the television media content.

8. A method as recited in claim 1, wherein the scene image in the program segments display bar includes at least one image generated from a video frame that represents the scene of the television media content.

9. A method as recited in claim 1, wherein the viewer-selectable command is received as a pause command to pause a display of the television media content, and wherein the program segments display bar is generated for display such that a current scene image which corresponds to the scene of the television media content that is paused is shown in the program segments display bar.

10. A television client device, comprising:
a media content input configured to receive television media content for display;
a display bar application configured to:
generate a program segments display bar of scene images that each correspond to a different scene of the television media content, the scene images each comprising two or more still images that are compiled into a single image and are selected from positions within each of the different scenes, the scene images configured for display in the program segments display bar to indicate a sequence of the television media content;
generate the program segments display bar to include advertisement images that each correspond to a different advertisement, the advertisement images configured for display in the program segments display bar to indicate a sequence of the advertisements within the television media content;
move a focus proximate one of the scene images or one of the advertisement images according to navigation inputs to position the focus, a navigation input that positions the focus proximate one of the advertisement images effective to initiate full-screen display of an advertisement regardless of whether a selection input is received for the advertisement image proximate to which the focus is positioned;
initiate shifting to a beginning of a scene of the television media content that corresponds to a scene image selected by a viewer from the program segments display bar according to a selection input of the scene image; and
a device manager configured to initiate rendering the television media content for display from the beginning of the scene of the television media content that corresponds to the selected scene image.

11. A television client device as recited in claim 10, wherein the device manager is further configured to:
receive a selection input to select one of the advertisement images from the program segments display bar;
obtain the advertisement that corresponds to the selected advertisement image; and
render the advertisement for display when initiated by the display bar application in response to the viewer selection of the advertisement image.

12. A television client device as recited in claim 10, wherein the display bar application is further configured to generate the program segments display bar to include the focus that can be positioned proximate the scene image.

13. A television client device as recited in claim 10, wherein the display bar application is further configured to recognize a position of the focus proximate the advertisement image, and initiate the device manager to render the advertisement that corresponds to the advertisement image for display.

14. One or more computer-readable media comprising computer-executable instructions that, when executed, implement a television client device to perform operations comprising:
generating a program segments display bar with still images that include scene images and advertisement images, the scene images each corresponding to a different scene of television media content and displayed in the program segments display bar to indicate a sequence of the television media content, the scene images each compiled from two or more images selected from positions within a respective scene to form a single image that is employed as the scene image, the advertisement images each corresponding to a different advertisement and displayed in the program segments display bar to indicate where the different advertisements are included with the television media content; and generating the program segments display bar with a focus that can be positioned proximate a still image such that the focus indicates that the still image is selectable, when the focus is positioned proximate an advertisement image according to a navigation input an advertisement is rendered that corresponds to the advertisement image, and when both the focus is positioned proximate a scene image according the navigation input and the scene image is selected according to a selection input the scene of the television media content is rendered that corresponds to the selected scene image.

15. One or more computer-readable media as recited in claim 14, wherein the operations further comprise:

receiving a selection input to select the scene image from the program segments display bar;

shifting to a beginning of the scene of the television media content that corresponds to the selected scene image; and rendering the television media content for display from the beginning of the scene of the television media content that corresponds to the selected scene image.

16. One or more computer-readable media as recited in claim 14, wherein the operations further comprise receiving a selection input to select the advertisement image from the program segments display bar, and rendering the advertisement for display.

17. One or more computer-readable media as recited in claim 16, wherein the operations further comprise requesting and obtaining the advertisement that corresponds to the selected advertisement image to be rendered for display.

18. One or more computer-readable media as recited in claim 14, wherein the operations further comprise recognizing a position of the focus proximate the advertisement image, obtaining the advertisement that corresponds to the advertisement image, and initiating that the advertisement that corresponds to the advertisement image be rendered for display.

19. One or more computer-readable media as recited in claim 14, wherein the operations further comprise recognizing a position of the focus proximate the scene image, and initiating that the scene image be rendered for full-screen display.

20. One or more computer-readable media as recited in claim 14, wherein the operations further comprise recognizing a position of the focus proximate the advertisement image, and initiating that the advertisement image be rendered for full-screen display.

* * * * *